United States Patent

Bhattiprolu

(10) Patent No.: US 11,520,326 B2
(45) Date of Patent: Dec. 6, 2022

(54) AUTOMATING CONSTRUCTION AND DEPLOYMENT OF PREDICTIVE MODELS FOR INDUSTRIAL PLANT ASSETS

(71) Applicant: Schneider Electric Systems USA, Inc., Foxborough, MA (US)

(72) Inventor: Subha Lalitha Bhattiprolu, Hyderabad (IN)

(73) Assignee: Schneider Electric Systems USA, Inc., Foxborough, MA (US)

( * ) Notice: Subject to any disclaimer, the term of this patent is extended or adjusted under 35 U.S.C. 154(b) by 0 days.

(21) Appl. No.: 17/085,456

(22) Filed: Oct. 30, 2020

(65) Prior Publication Data

US 2021/0132600 A1 May 6, 2021

Related U.S. Application Data

(60) Provisional application No. 62/927,998, filed on Oct. 30, 2019.

(51) Int. Cl.
*G05B 23/02* (2006.01)
*G05B 19/418* (2006.01)

(52) U.S. Cl.
CPC ..... *G05B 23/0283* (2013.01); *G05B 19/4183* (2013.01); *G05B 19/41865* (2013.01)

(58) Field of Classification Search
CPC .......... G05B 23/0283; G05B 19/41865; G05B 19/4183; G06Q 10/04
See application file for complete search history.

(56) References Cited

U.S. PATENT DOCUMENTS

| 10,234,853 B2 | 3/2019 | Mukkamala et al. |
| 2015/0149134 A1* | 5/2015 | Mehta ................ G05B 23/0245 703/6 |
| 2017/0192414 A1* | 7/2017 | Mukkamala ........ H04L 63/0823 |
| 2017/0357249 A1* | 12/2017 | Sandler ............ G05B 19/41835 |
| 2018/0121183 A1* | 5/2018 | Subramaniyan .... G06F 9/45558 |

OTHER PUBLICATIONS

International Search Report and Written Opinion for PCT application No. PCT/US2020/058270 dated February 23, 2021, 12 pages.
Locke, Dave; "Introduction to MQTT"; May 15, 2013; XP055358496, retrieved from the Internet: URL:https://www.basis-open.org/committees/download.php/49205/MQTT-OASIS-Webinar.pdf [retrieved on Mar. 24, 2017]; 28 pages.

* cited by examiner

*Primary Examiner* — Christopher E. Everett
(74) *Attorney, Agent, or Firm* — Locke Lord LLP

(57) ABSTRACT

Systems and methods provide a way for users to leverage existing data-driven models, components, and functions to deploy predictive diagnostics on industrial assets. The systems and methods allow the users to retrieve and assemble existing models, components, and functions into individual packages or containers called "analytics avatars" that can be saved and stored as independent predictive diagnostic units or entities. The analytics avatars can then be deployed on virtually any analytics platforms to provide predictive diagnostics for the industrial assets. The ability to leverage existing predictive diagnostic models and components from plant to plant across different platforms for equipment of the same type provides consistency and reduces the time and effort required to engineer and deploy predictive diagnostics.

20 Claims, 12 Drawing Sheets

AUTOMATING CONSTRUCTION AND DEPLOYMENT OF PREDICTIVE MODELS FOR INDUSTRIAL PLANT ASSETS

CROSS-REFERENCE TO RELATED APPLICATIONS

This application claims the benefit of and priority to U.S. Provisional Application No. 62/927,998, filed on Oct. 30, 2019, which is incorporated by reference herein in its entirety.

TECHNICAL FIELD

Embodiments of the present disclosure relate generally to the use of predictive diagnostics to monitor industrial assets and, more particularly, to systems and methods for efficient construction and deployment of predictive diagnostics for such industrial assets.

BACKGROUND

Predictive diagnostics in industrial plants generally refer to pattern recognition tools and programs that monitor industrial assets (e.g., equipment, instruments, sensors, etc.) to provide advance warnings of problems. Such predictive diagnostics, also referred to as predictive analytics or prognostics in some cases, generally use models of the industrial assets derived from historical data to infer changes in asset operation. The historical data is processed using machine learning algorithms that determine or "learn" relationships between an asset's inputs, outputs, and operating conditions from the historical data. These relationships are then used to construct models that can simulate the operational profile or behavior of particular industrial assets. Actual or live data from the industrial assets may then be applied to the models in real time (or near real-time) to infer changes in the assets that could lead to failure.

Predictive diagnostics has proven to be highly beneficial for industrial asset management, especially for plants with complex equipment like turbomachinery and the like. However, providers of industrial asset predictive diagnostics have tended to develop each product/solution for a given asset from the beginning rather than reuse previously developed products/solutions, or portions thereof. This approach often results in multiple products/solutions being separately developed for the cloud, at the edge, and/or embedded in devices, that provide essentially the same predictive diagnostics for essentially the same type of industrial assets.

Thus, while a number of advances have been made in the field of predictive diagnostics for industrial assets, it will be readily appreciated that improvements are continually needed.

SUMMARY

The present disclosure generally relates to systems and methods for efficient construction and deployment of predictive diagnostics to detect faults and the like in industrial plant assets. The systems and methods provide a way for users to efficiently assemble existing data-driven models, components, and functions into packages or containers called "analytics avatars" that can be deployed across multiple different platforms. Each analytics avatar may be represented graphically using an icon or image that may be easily manipulated graphically, or as a file that is referenced using a file name and an appropriate file extension, or both.

The ability to leverage existing predictive diagnostic models and components from plant to plant for equipment of the same type across different platforms provides consistency and reduces the time and effort required to engineer and deploy predictive diagnostics.

In general, in one aspect, the present disclosure relates to a system for providing predictive diagnostics on an industrial asset. The system comprises at least one processor, and a storage system communicatively coupled to the at least one processor. The storage system stores instructions thereon that, when executed by the at least one processor, cause the system to, among other things, perform a process that selects an analytics avatar from a plurality of analytics avatars in a repository, each analytics avatar configured to provide a respective predictive diagnostic function for a respective asset of a respective type, independent of computing systems. The instructions, when executed by the at least one processor, also cause the system to perform a process that deploys the analytics avatar to a first computing system, the analytics avatar operating on the first computing system to provide a given predictive diagnostic function. The instructions, when executed by the at least one processor, further cause the system to perform a process that deploys the analytics avatar to a second computing system different from the first computing system, the analytics avatar operating on the second computing system to provide the given predictive diagnostic function.

In general, in another aspect, the present disclosure relates to a method of providing predictive diagnostics on an industrial asset. The method comprises, among other things, selecting a first analytics avatar from a plurality of analytics avatars in a repository, each analytics avatar configured to provide a respective predictive diagnostic function for a respective asset of a respective type, independent of computing systems. The method further comprises deploying the first analytics avatar to a first computing system, the first analytics avatar operating on the first computing system to provide a given predictive diagnostic function, and deploying the first analytics avatar to a second computing system different from the first computing system, the first analytics avatar operating on the second computing system to provide the given predictive diagnostic function.

In general, in yet another aspect, the present disclosure relates to a system for providing predictive diagnostics on an industrial asset. The system comprises, among other things, a repository storing a plurality of analytics avatars thereon, each analytics avatar configured to provide a respective predictive diagnostic function for a respective asset of a respective type, independent of computing systems. The system further comprises a studio platform connected to the repository, the studio platform having a plurality of avatar tools thereon. The plurality of avatar tools are configured to select a first analytics avatar from the plurality of analytics avatars in the repository, and deploy the first analytics avatar to a first computing system, the first analytics avatar operating on the first computing system to provide a given predictive diagnostic function. The plurality of avatar tools are configured to deploy the first analytics avatar to a second computing system different from the first computing system, the first analytics avatar operating on the second computing system to provide the given predictive diagnostic function.

In accordance with any one or more of the foregoing embodiments, the plurality of workers are selected from the repository and the workers are connected to one another to build a data processing pipeline, each worker performing a different task in the data processing pipeline.

In accordance with any one or more of the foregoing embodiments, the plurality of workers and the data processing pipeline are containerized to form a second analytics avatar, the second analytics avatar configured to provide a different diagnostic function from the first analytics avatar. In accordance with any one or more of the foregoing embodiments, the second analytics avatar are stored to the repository for subsequent use and reuse.

In accordance with any one or more of the foregoing embodiments, the first analytics avatar provides the given predictive diagnostic function for a given asset of a given type, and is loosely coupled to a data stream from the given asset of the given type. In accordance with any one or more of the foregoing embodiments, the first analytics avatar provides the given predictive diagnostic function for a given asset of a given type, and is coupled to a digital twin of the given asset of the given type.

In accordance with any one or more of the foregoing embodiments, the results of the given predictive diagnostic function of the first analytics avatar are output to a monitor and control system, and wherein the monitor and control system takes a specified corrective action based on the results of the given predictive diagnostic function.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
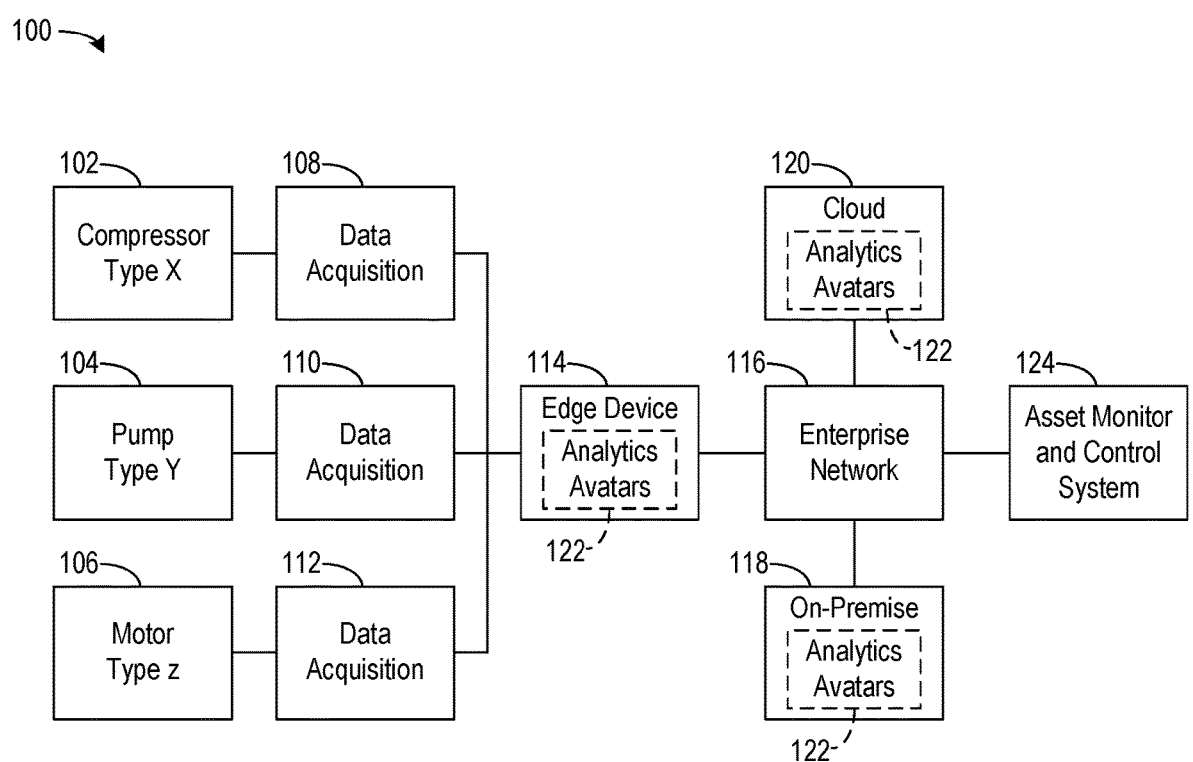
FIG. 1 is a block diagram illustrating an exemplary industrial site according to embodiments of the present disclosure.

This description and the accompanying drawings illustrate exemplary embodiments of the present disclosure and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is noted that, as used in this specification and the appended claims, the singular forms "a," "an," and "the," and any singular use of any word, include plural references unless expressly and unequivocally limited to one reference. As used herein, the term "includes" and its grammatical variants are intended to be non-limiting, such that recitation of items in a list is not to the exclusion of other like items that can be substituted or added to the listed items.

As alluded to earlier, embodiments of the present disclosure provide systems and methods for containerizing or packaging core analytics components and distributing the containers or packages as "analytics avatars." Each "analytics avatar" or simply "avatar" includes a selection or bundle of models, modules, algorithms, and other software components that work together to provide a particular predictive diagnostic function for a given type of industrial asset. These models, modules, algorithms, and other software components may be selected from a registry or repository of existing models, modules, algorithms, and components to provide a desired predictive diagnostic function. The analytics avatars can then be deployed across multiple different computing platforms, including the cloud, an edge device, and embedded devices, such as an embedded programmable logic controllers (PLC) and the like. The above arrangement provides a platform-agnostic way to package predictive diagnostic software components along with their runtime dependencies for efficient and convenient use and reuse.

The avatars operate to provide predictive diagnostic functions in much the same way as predictive diagnostic solutions/products that are built from scratch. Thus, the avatars can process incoming data streams for a given industrial asset, apply machine learning (ML), artificial intelligence (AI), statistical algorithms, and other data analysis techniques to the assets, and provide useful insights about the asset. Such insights may include predicting operational anomalies, faults, time to failure, remaining useful life, and the like. Depending on the deployment, the data processing or data predictor portions of the avatars (i.e., where computation takes place) may be functionally set or fixed, whereas the data access and data storage portions of the avatars may be variable and open. The variability provides the avatars with flexibility to operate on assets over multiple different platforms (e.g., edge, cloud, embedded device, etc.).

In some embodiments, an avatar platform or avatar studio provides tool sets that can be used to facilitate building, engineering, training, deploying, managing, and maintaining the avatars in a consistent manner. Once built, trained, tested, and validated, the avatar for a particular equipment can be uploaded to a registry or repository of avatars. Users may search for and download desired avatars from the repository, then re-train and re-attach the avatars to another equipment of the same type, or a data stream representing the equipment (i.e., an instance of the equipment), to provide insight about that equipment. This provides a simple and efficient way for users to obtain a predictive diagnostic function without having to build or construct such predictive diagnostic function from scratch.

In some embodiments, the core analytics components mentioned above are provided in the form of "workers" that perform specific tasks needed to achieve the predictive diagnostic functions. Examples of workers may include a data transformation worker, a data cleansing worker, a decision tree predictor, and the like. Multiple task-specific workers may then be combined with one another to build a data processing pipeline for the avatar. These workers may be written in any suitable programming language, such as Python, R, MATLAB, and the like, then saved in a repository for subsequent use and reuse. The saved and stored workers may then be selected and dragged and dropped using the tool sets from the avatar studio mentioned above to form the data processing pipeline. In some embodiments, each worker may have a configuration file or manifest associated therewith, and the workers may be configured by editing their respective configuration files or manifests using an appropriate editor (e.g., text editor, XML editor, etc.). The workers, pipelines, and manifests, along with the corresponding runtime execution environment, may thereafter be containerized using suitable container technologies to create or package the avatars.

The avatar studio may aid in bundling the runtime execution environment of the avatar for deployment. A containerized avatar can be configured with respect to its data access and storage aspects, and can be deployed on multiple analytics platforms (e.g., cloud, virtual machines (VM), edge devices, etc.). The same avatar can also be deployed on an embedded platform like a PLC. The avatar may be trained offline and subsequently deployed to a computing platform, or the avatar may be simultaneously self-learning while processing streamed data. A developed avatar may be trained and tested for an equipment instance and, depending upon the accuracy satisfaction levels or QOS, that trained and tested avatar along with its runtime dependencies may be packaged in a single container or multiple containers, as needed. The avatar then starts providing predictive insights about the equipment to which it is tied. When similar predictive diagnostics is needed for another, similar type of equipment, the trained avatar from the repository may be retrained with data from the new equipment as needed. The retrained avatar may then be tied, bound, or otherwise deployed to an instance of the new equipment.

Referring now to FIG. 1, an exemplary industrial site 100 or portion thereof in accordance with embodiments of the disclosure is shown. The industrial site 100 has a plurality of industrial assets installed at the site that are associated with a particular industrial process or processes. The industrial processes may include a chemical process, a manufacturing process, an assembly process, an extraction process, and various other kinds of industrial processes. In the FIG. 1 example, only a compressor 102, a pump 104, and a motor 106 are shown at the industrial site 100. Other industrial assets may of course be present at the industrial site 100 within the scope of the present disclosure. The compressor 102 is a particular type of compressor, such as a centrifugal compressor, a scroll compressor, a reciprocating compressor, and the like, referred to as Type X for economy. Similarly, the pump 104 is a particular type of pump, such as a hydraulic pump, a piston pump, an electric semisubmersible pump, and the like, referred to as Type Y. The motor 106 is likewise a particular type of motor, such as a series motor, a shunt motor, a repulsion motor, and the like, referred to as Type Z.

The compressor 102, pump 104, motor 106, and other industrial assets may each include or be coupled to one or more sensors and instrumentations that monitor and acquire various data about the assets and operation thereof. The sensors and instrumentations for the compressor 102, pump 104, motor 106 are depicted here generally as data acquisition units 108, 110, and 112, respectively. These data acquisition units 108, 110, 112 may be configured to sample, sense, or monitor one or more parameters (e.g., industrial parameters) associated with the industrial assets. For example, one or more temperature sensors may be coupled to the compressor 102 to obtain temperature data at an inlet and/or an outlet of the compressor. Other types of data may include pressure data, flow data, vibration data, and any other data associated the industrial assets and/or the industrial process or processes.

An edge device 114 provides access to an enterprise network 116 for the data acquisition units 108, 110, 112 to communicate the collected data to downstream computing nodes, including on-premise computing nodes 118 and cloud computing nodes 120. The communication may take place over any suitable wired or wireless communication link (e.g., Ethernet, Wi-Fi, Bluetooth, GPRS, CDMA, satellite, etc.) or combination thereof. The edge device 114, which is also a computing node, may be any type of edge device or appliance so long as the device has sufficient processing capacity for the purposes discussed herein. Examples of suitable edge devices include gateways, routers, routing switches, integrated access devices (IADs), and various MAN and WAN access devices.

In accordance with embodiments of the present disclosure, the edge device 114 has one or more analytics avatars 122 deployed thereon. The analytics avatars 122 are specifically designed to operate with the types of compressor 102, pump 104, and/or motor 106 shown in FIG. 1. In alternative embodiments, instead of the edge device 114, the one or more analytics avatars 122 may be deployed on one of the on-premise computing nodes 118, or one of the cloud computing nodes 120. It is also possible for portions of one analytics avatar 122 to be distributed over two or more of the edge device 114, the on-premise computing nodes 118, and the cloud computing nodes 120. Further, although not expressly shown in FIG. 1, in some embodiments, the one or more analytics avatars 122 may also be deployed in an embedded device within the compressor 102, the pump 104, and/or the motor 106, such as a PLC.

Once deployed, the one or more analytics avatars 122 operate on the compressor 102, the pump 104, and/or the motor 106, or the instances thereof, to provide predictive insights. As mentioned earlier, such insights may include predicting operational anomalies, faults, time to failure, remaining useful life, and other predictive diagnostic function. The predictive insights and predictions generated by the one or more analytics avatars 122 may thereafter be communicated to an asset monitor and control system 124 for taking any actions, such as corrective actions (e.g., cutting power, reducing speed, sounding an alarm, etc.), that may be needed based on the predictive insights provided. The asset monitor and control system 124 may be any system that can consume the predictive insights and predictions generated by the one or more analytics avatars 122, including internal systems and third-party systems.

Figure 2:
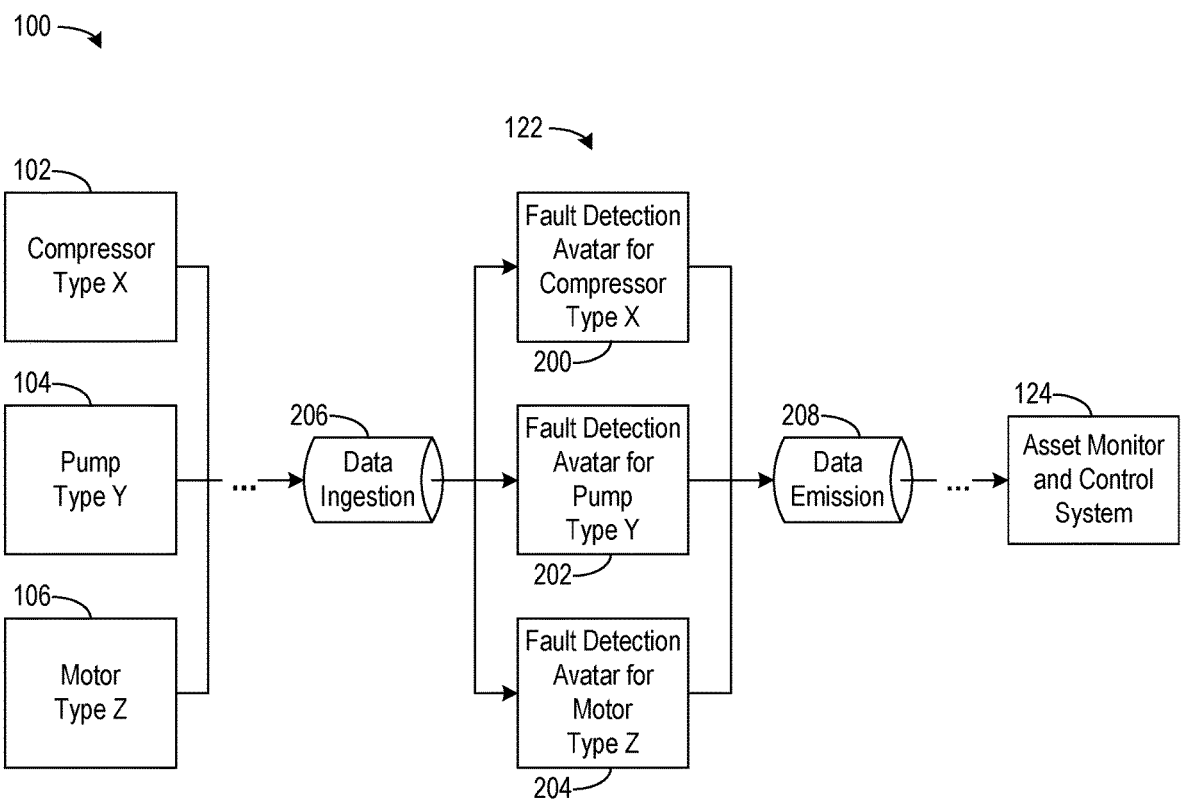
FIG. 2 is a block diagram illustrating exemplary analytics avatars according to embodiments of the present disclosure.

FIG. 2 illustrates a simplified view of the exemplary analytics avatars 122 from FIG. 1 in more detail. As can be seen in this example, the analytics avatars 122 include a compressor fault detection avatar 200 for a Type X compressor, a pump fault detection avatar 202 for a Type Y pump, and a motor fault detection avatar 202 for a Type Z motor. Each analytics avatar 200, 202, 204 contains core analytics components (e.g., ML, AI, neural network algorithms, etc.) designed to operate with its respective industrial asset, namely the compressor 102, the pump 104, and the motor 106 (or the instances thereof). These analytics avatars 200, 202, 204 are atomic, independent, and self-reliant packages or bundles of core analytics components that can run on any platform, including in the cloud, on edge devices, or in embedded devices.

A data ingestion process 206 loosely couples the various analytics avatars 200, 202, 204 to their respective industrial assets. Similarly, a data emission process 208 loosely couples the various analytics avatars 200, 202, 204 to the asset monitor and control system 124. The data ingestion process 206 effectively decouples each analytics avatars 200, 202, 204 from its respective industrial asset to allow the avatar to operate independently of the specific means used to stream or otherwise feed data from the industrial asset to the avatar. Likewise, the data emission process 208 effectively decouples the analytics avatars 200, 202, 204 from the asset monitor and control system 124 to allow the avatars to operate independently of the specific means used to stream or otherwise send the analytics generated by the avatars to the monitor and control application. In some embodiments, the loose coupling is implemented via the containerization software that containerizes the analytics avatar, which allows the avatar to communicate with any computing platform to which it may be deployed using an appropriate messaging protocol. Suitable messaging protocols may include AMQP (Advanced Message Queueing Protocol), MQTT (Message Queuing Telemetry Transport), JMS (Java Messaging Service), XMPP (Extensible Messaging and Presence Protocol), and other messaging protocols.

Figure 3:
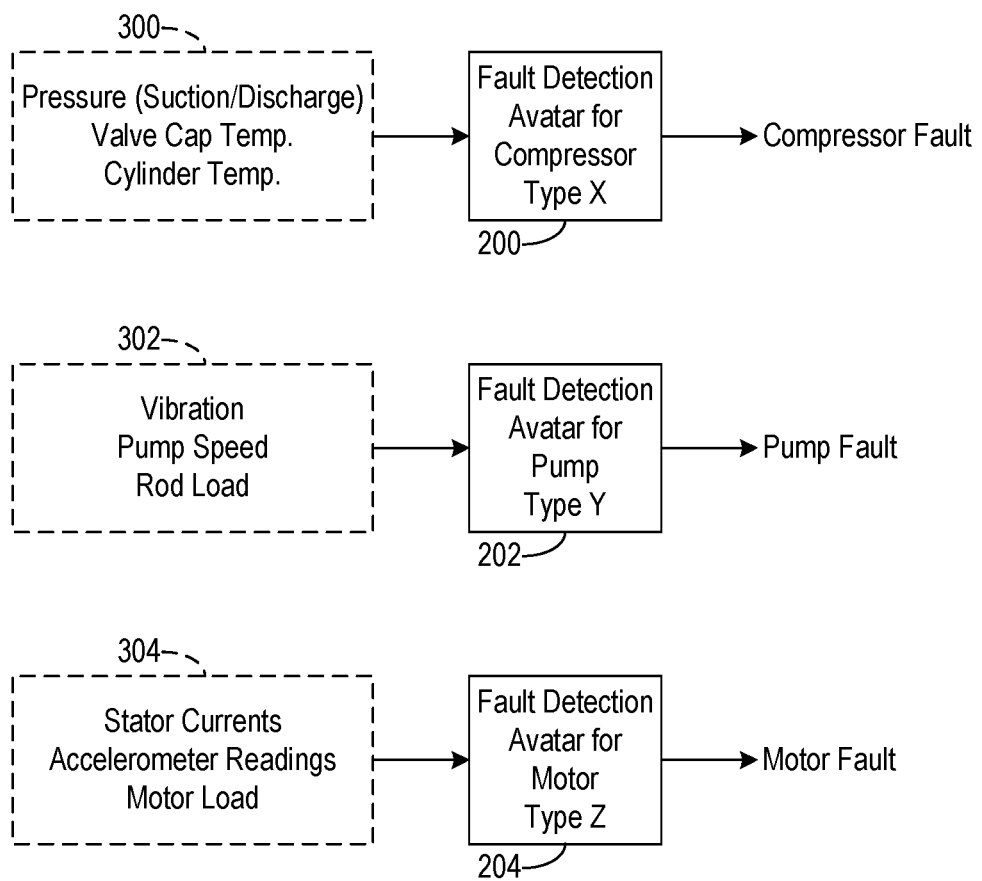
FIG. 3 is a block diagram illustrating exemplary data ingested by analytics avatars according to embodiments of the present disclosure.

FIG. 3 illustrates exemplary types real-time input signals from the equipment that may be streamed or otherwise fed to the exemplary analytics avatars 200, 202, 204 from their respective industrial assets (via the data ingestion process 206). In this example, compressor data 300 from a Type X compressor may include pressure (e.g., suction pressure, discharge pressure), valves cap temperature, cylinder temperature, and the like. From this compressor data, the compressor fault detection avatar 200 may predict, for example, a compressor fault such as a blocked suction line and the time until the compressor fault. On the other hand, pump data 302 from a Type Y pump may include vibration frequencies, pump speed, rod load, and the like. From this pump data, the pump fault detection avatar 202 may predict, for example, a pump fault such as cavitation and the time until the pump fault. Motor data 304 from a Type Z motor may include stator currents, accelerometer readings, motor load, and the like. From this motor data, the motor fault detection avatar 204 may predict, for example, a motor fault such as a shaft imbalance and the time until the motor fault. In addition to the above examples, avatars may also be provided for other common problems and fault in different types of rotating machinery, such as avatars that monitor for excessive vibration, overheating, and the like.

Figure 4:
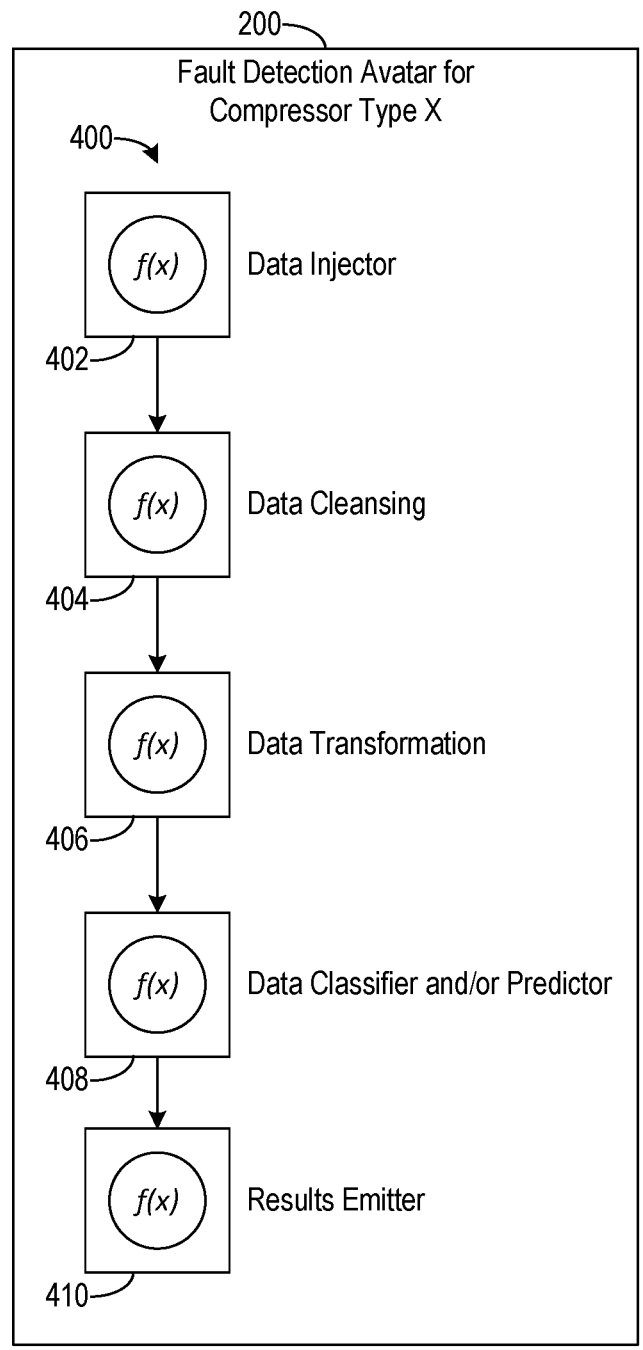
FIG. 4 is a block diagram illustrating exemplary workers for an analytics avatar according to embodiments of the present disclosure.

FIG. 4 illustrates several of the exemplary workers mentioned earlier that may be used to build a data processing pipeline 400 for an analytics avatar. These workers provide the core analytics components needed to construct an avatar, such as the compressor fault detection avatar 200. The specific workers shown here each contain or perform a specific task, each worker performing a different task, needed by the avatar 200 to be able to provide its predictive diagnostic functions specifically for a Type X compressor. In this example, the workers include a data injector worker 402, a data cleansing worker 404, a data transformation worker 106, a data classifier and/or predictor worker 408, and a results emitter worker 410. A user may select these workers (e.g., from a repository of workers) and drag and drop them into the compressor fault detection avatar 200 to build the data processing pipeline 400 therefor. It will be appreciated that other workers in addition to or instead of the workers shown here may also be selected and dragged and dropped to form the avatar 200, depending on the particular predictive diagnostic function needed.

Operation of the workers shown in FIG. 4 is generally well known and thus is not described in detail here. Suffice it to say, the data injector worker 402 operates as a data intake for the avatar 200 to receive and accept the data being streamed to the avatar using an appropriate messaging protocol. The data cleansing worker 404, as the name suggests, operates to detect and correct or filter any corrupted data or any excessive or extraneous data (i.e., noise). The data transformation worker 406 transforms the data from a received format to a format that can be used by the data classifier and/or predictor worker 408. The data classifier and/or predictor worker 408 processes the data and looks for patterns in the data using, for example, ML, AI, various neural network algorithms, and the like, in order to infer the likelihood of a fault or other problems and, in some cases, the time until occurrence of the fault or problems. The results emitter worker 410 operates to output any predictive diagnostics generated by the avatar 200 in a specified form.

Figure 5:
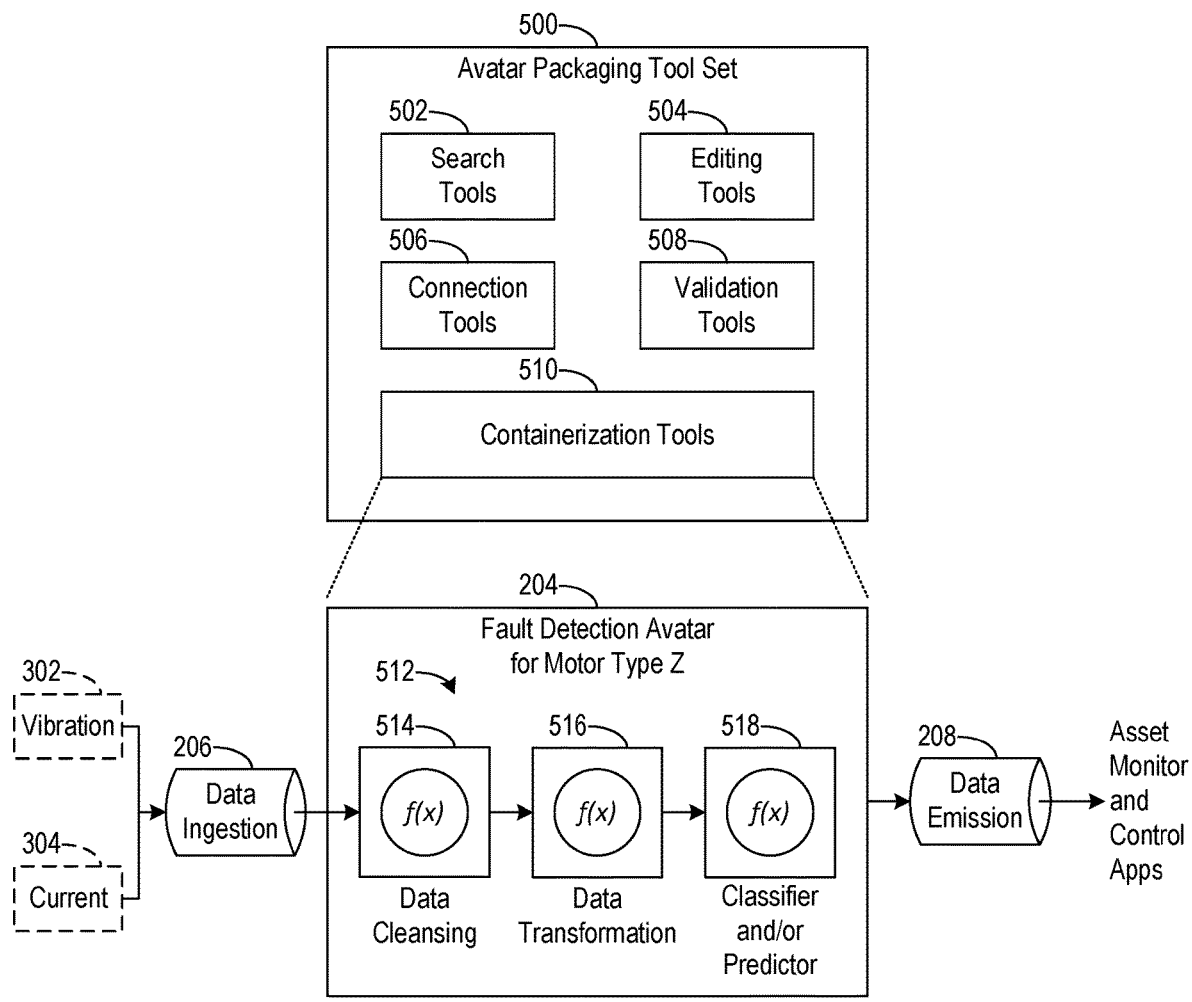
FIG. 5 is a block diagram illustrating an exemplary motor fall detection avatar according to embodiments of the present disclosure.

Referring now to FIG. 5, an exemplary avatar packaging tool set 500 is shown that a user may use to construct an analytics avatar, such as the motor fault detection avatar 204. The exemplary tool set 500 may contain or include various software tools needed for a user to assemble workers into a data processing pipeline for the avatar 204. In the example shown, the avatar packaging tool set 500 includes search tools 502 that can access a worker registry or repository (not expressly shown) to allow the user to search for specific workers. The tool set 500 also includes editing tools 504 that the user may use to modify or adjust the workers as needed for a particular avatar. Connection tools 506 are also present that the user may use to create or otherwise specify connections between various workers to assemble a data processing pipeline. Validation tools 508 allow the user to check and verify that the connections between the workers operate as intended. The user may then use one or more containerization tools 510 to encapsulate the selected workers into a package or container that may be deployed on virtually any type of computing platform (e.g., cloud, edge, embedded device, etc.). Examples of suitable container software that may be used as the containerization tools 510 include Docker and Nano containers, among others.

In the example of FIG. 5, the user has assembled a data processing pipeline 512 made of workers that are specific to Type Z motors. In this example, the data processing pipeline 512 is being used to analyze measured vibration and stator current to predict motor faults, such as bearing faults, rotor faults, and the like. Thus, the user has searched a worker repository and found a suitable data cleansing worker 514, data transformation worker 516, and classifier and/or predictor worker 518 using the search tools 502. The data cleansing worker 514 removes noise and other unwanted artifacts from the data and passes only "good" data samples to subsequent workers for processing. The data transformation worker 516 converts the "good" data into a suitable format for subsequent workers to process, for example, by converting time domain vibration data 302 into frequency domain data (e.g., using a Fast Fourier Transform (FFT)), or by converting measured current data 304 into RMS data, and the like. The classifier and/or predictor worker 518 is trained to process the data and detect certain data features that indicate a likelihood of a fault.

The above results in an analytics avatar 204 that is developed specifically for deployment with Type Z motors, or instances thereof, to detect faults. Those having ordinary skill in the art will understand that different workers from those shown in FIG. 5 may be used (or reused) to develop other types of analytics avatars for Type Z motors, such as anomaly detection avatars, aging detection avatars, and the like. And of course analytics avatars that are designed to be deployed with entirely different assets and asset types may also be developed, such as the compressors and pumps discussed earlier, using (or reusing) the same or different workers after appropriate training (or retraining) of the workers. Moreover, although the avatars are developed specifically for a certain asset and asset type, once constructed, each avatar may be deployed on multiple computing platforms by virtue of being containerized and having a loose coupling to the input data streams and the output data stream (via data ingestion process 206 and data emission process 208).

Figure 6:
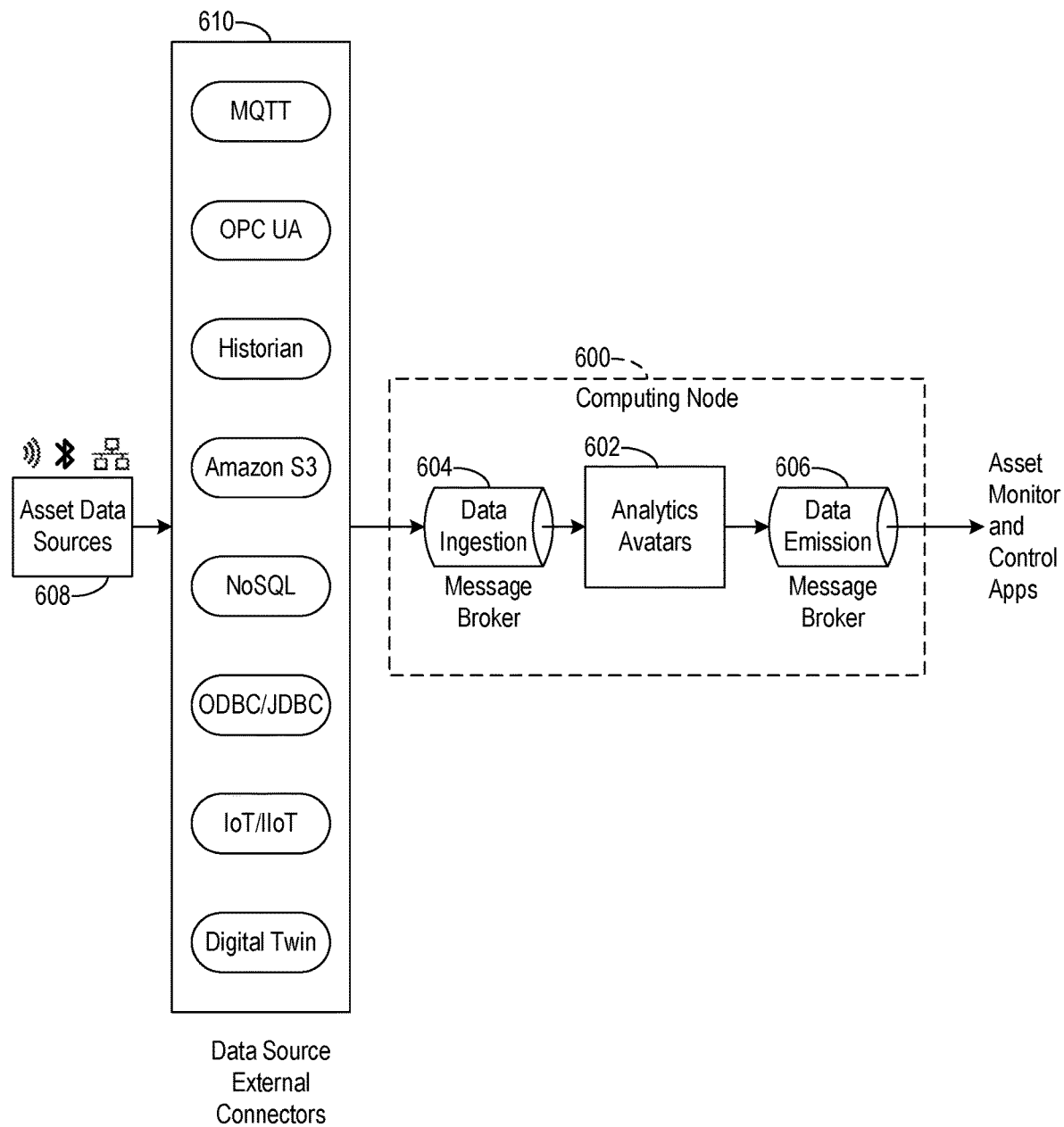
FIG. 6 is a block diagram illustrating exemplary data sources for an analytics avatar according to embodiments of the present disclosure.

Examples of loosely coupled input data streams can be seen in FIG. 6, which shows a generic computing node 600 for illustrative purposes. One or more generic analytics avatar 602 are deployed on the computing node 600, each avatar connected to a data ingestion process 604 and a data emission process 606. In the example shown, the data ingestion process 604 and the data emission process 606 may take the form of or be implemented as message brokers configured to receive and send messages using a particular messaging protocol. The message brokers 604 and 606 basically decouple the analytics avatars 602 from their asset data sources 608 and output applications (e.g., an asset monitor and control application), respectively. This allows data from the asset data sources 608 to be streamed or otherwise fed to the analytics avatars 602 over any suitable wireless and/or wired data communication link, including Wi-Fi, LPWAN (LoRA), ZigBee, Bluetooth, Ethernet, cellular, satellite, and the like.

In FIG. 6, data from the asset data sources 608 may be streamed or otherwise fed to the analytics avatars 602 through one or more messaging servers 610 executing a suitable messaging protocol. Examples of suitable messaging servers 610 that may be used include a MQTT server, an OPC UA (Open Platform Communications Unified Architecture) server, and a data historian server. Other servers that may be used include Amazon S3 server, a No SQL server, a ODBC/JDBC (Open Database Connectivity/Java Database Connectivity) server, and an IoT/IIoT (Industrial Internet of Things) server. As well, the analytics avatars 602 may be loosely coupled to a "digital twin" or digital representation (i.e., virtualization) of the asset residing on the cloud or an on-premise compute node. Such an arrangement provides the flexibility to develop or otherwise design the data ingestion and emission process 604 and 606, respectively, to ingest and output data using any desired or required messaging protocol. Indeed, in embodiments where data is being provided by a digital twin, it is possible for the analytics avatars to be connected directly to the digital twin without the need for a data ingestion process.

Figure 7:
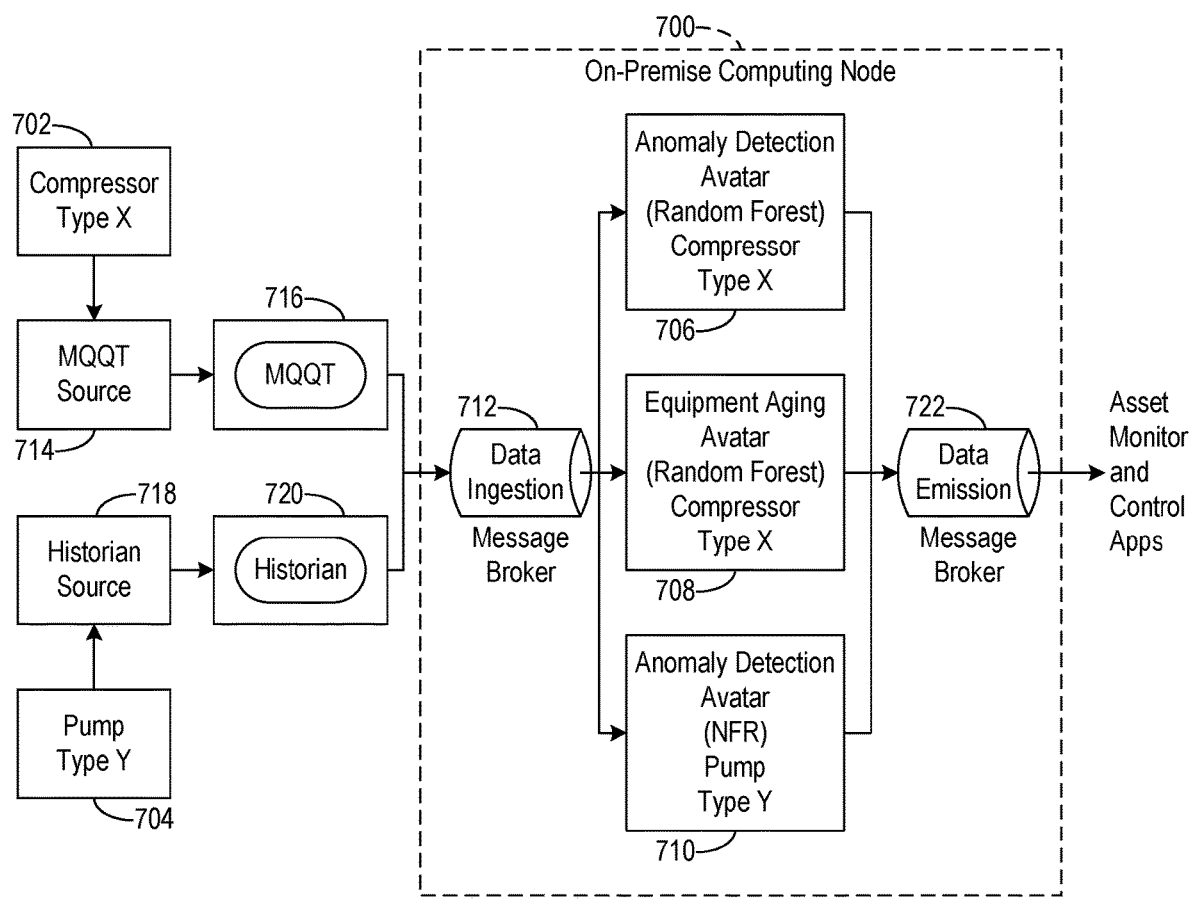
FIG. 7 is a block diagram illustrating exemplary data ingestion for analytics avatars according to embodiments of the present disclosure.

FIG. 7 illustrates a more specific example of the generic implementation shown in FIG. 6. Several analytics avatars are deployed on an on-premise computing node 700 for a Type X compressor 702 and a Type Y pump 704. The analytics avatars include an anomaly detection avatar 706 for a Type X compressor that uses a Random Forest ML algorithm, an equipment aging avatar 708 also for a Type X compressor that also uses a Random Forest ML algorithm, and an anomaly detection avatar 710 for a Type Y pump that uses an NFR (Natural Forest Regeneration) ML algorithm. A data ingestion process 712 (e.g., message broker) loosely couples these analytics avatars 706, 708, 710 to the compressor 702 and the pump 704. Data from the compressor 702 is collected by an MQTT source 714 and forwarded to an MQTT server 716 for streaming to the data ingestion process 712. Similarly, data for the pump 704 is collected by an historian source 718 and forwarded to a data historian server 720 for streaming to the data ingestion process 708. At the output end, a data emission process 722 (e.g., message broker) loosely couples the analytics avatars 706, 708, 710 to one or more end applications, such as an asset monitor and control application.

Figure 8:
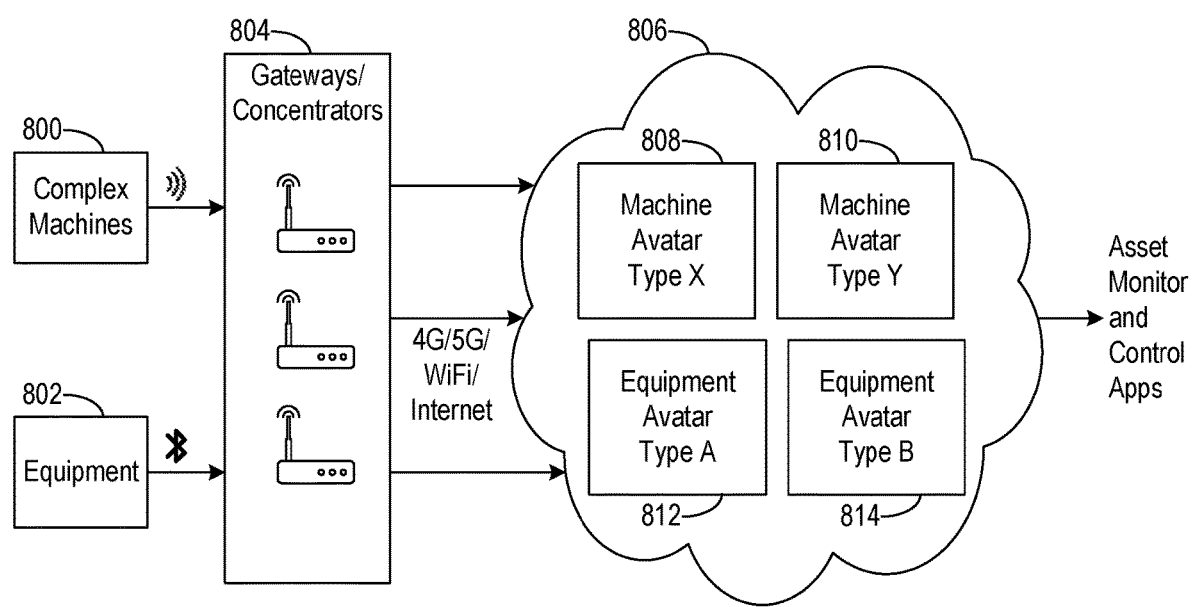
FIG. 8 is a schematic diagram illustrating an exemplary IoT deployment of analytics according to embodiments of the present disclosure.

FIG. 8 illustrates an example of analytics avatars being deployed in an IoT/IIoT environment. In this example, data from numerous complex machines 800 (e.g., motors, compressors, pumps, etc.) and equipment 802 (e.g., boilers, chillers, mixers, etc.) are being wirelessly transmitted through one or more gateways or concentrators 804 to several analytics avatars residing on a cloud platform 806. The data may include, for example, equipment sensor readings, process instrument readings, distributed control system data, equipment control systems data, computerized maintenance management system data, any other types of data that are relevant to the operation of an industrial facility. Each type of data from each type of machine or equipment is processed by an analytics avatar that was developed for that type of data from that type of machine. For example, there may be a machine avatar 808 for a Type X machine, a machine avatar 810 for a Type Y machine, an equipment avatar 812 for a Type A equipment, an equipment avatar 814 for Type B machine, and the like. Predictive diagnostics generated by the analytics avatars 808, 810, 812, 814, are subsequently provided to an end application such as asset monitor and control application.

Figure 9:
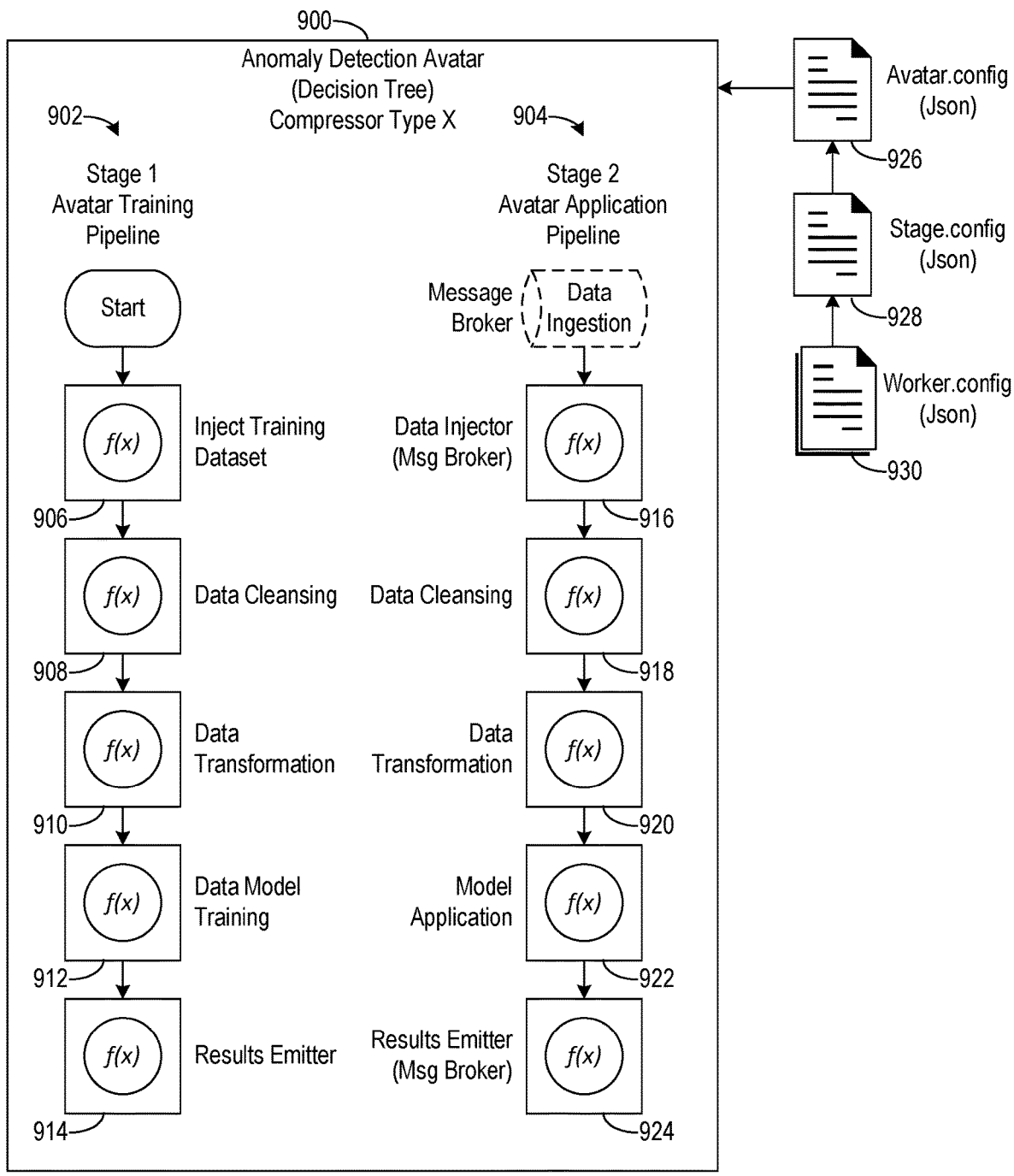
FIG. 9 is a block diagram illustrating an exemplary stages for an analytics avatar according to embodiments of the present disclosure.

FIG. 9 illustrates an exemplary embodiment of the present disclosure in which workers are used (or reused) to construct an analytics avatar 900 that has multiple data processing pipelines. The analytics avatar 900 in this example employs a Decision Tree ML algorithm to provide anomaly detection for a Type X compressor. Two distinct data processing pipelines have been built to support the Decision Tree algorithm by selecting and dragging and dropping existing workers—a Stage 1 training pipeline 902, and a Stage 2 application pipeline 904. Each worker is written in a supported programming language (e.g., Python, R, MATLAB, etc.) and contains one more predictive diagnostic tasks that are configured to be performed or operate in a pipeline configuration.

The Stage 1 training pipeline 902 includes a worker 906 for injecting one or more training datasets, a worker 908 for filtering and cleaning the datasets (e.g., to remove noise, etc.), a worker 910 for converting the training dataset (e.g., transform from time domain to frequency domain), a worker 912 for training one or more Decision Trees modeling a compressor Type X, and a worker 914 for outputting the results produced by the one or more models. Each worker as well as each analytics avatar may be represented graphically using an icon or image that a user may graphically manipulate (e.g., drag and drop), or as a file having a file name and an appropriate file extension, or both.

The Stage 2 application pipeline 904 includes a data injector worker 916, a data cleansing worker 918, a data transformation worker 920, a model application worker 922, and a results emitter 924. The data injector worker 916 receives and accepts data for the avatar 900 via the data ingestion process mentioned earlier using an appropriate messaging protocol. The data cleansing worker 918 cleans and filters any corrupted or extraneous data, while the data transformation worker 920 converts the data into an appropriate format. The model application worker 922 operates to detect anomalies in a similar manner to the data model training worker 912 except that actual data being streamed to the avatar is used instead of historical data. The results emitter worker 924 outputs any predictive diagnostics generated the model application worker 922 for external consumption.

In some embodiments, each worker has a worker configuration file 926 associated with that worker. The worker configuration file may be a text-based file in some embodiments, such as a JSON (JavaScript Object Notation) file, that a user may edit in order to alter the behavior of the worker. In a similar manner, each pipeline 902, 904 also has a text-based stage configuration file 928 associated therewith that a user may edit to alter the arrangement of the workers (and hence the functionality) for the stage. Likewise, the avatar 900 has a text-based avatar configuration file 930 associated therewith that a user may edit to alter the arrangement of the workers and pipelines (and hence the predictive diagnostics thereof) of the avatar. The workers, pipelines, and various configuration files may then be packaged and containerized as a discrete and independent predictive diagnostic unit or avatar (e.g., Anomaly_Detection.avt). The avatar 900 can then be stored in a registry and/or repository for subsequent retrieval, deployment, and reuse on virtually any analytics platform.

Figure 10:
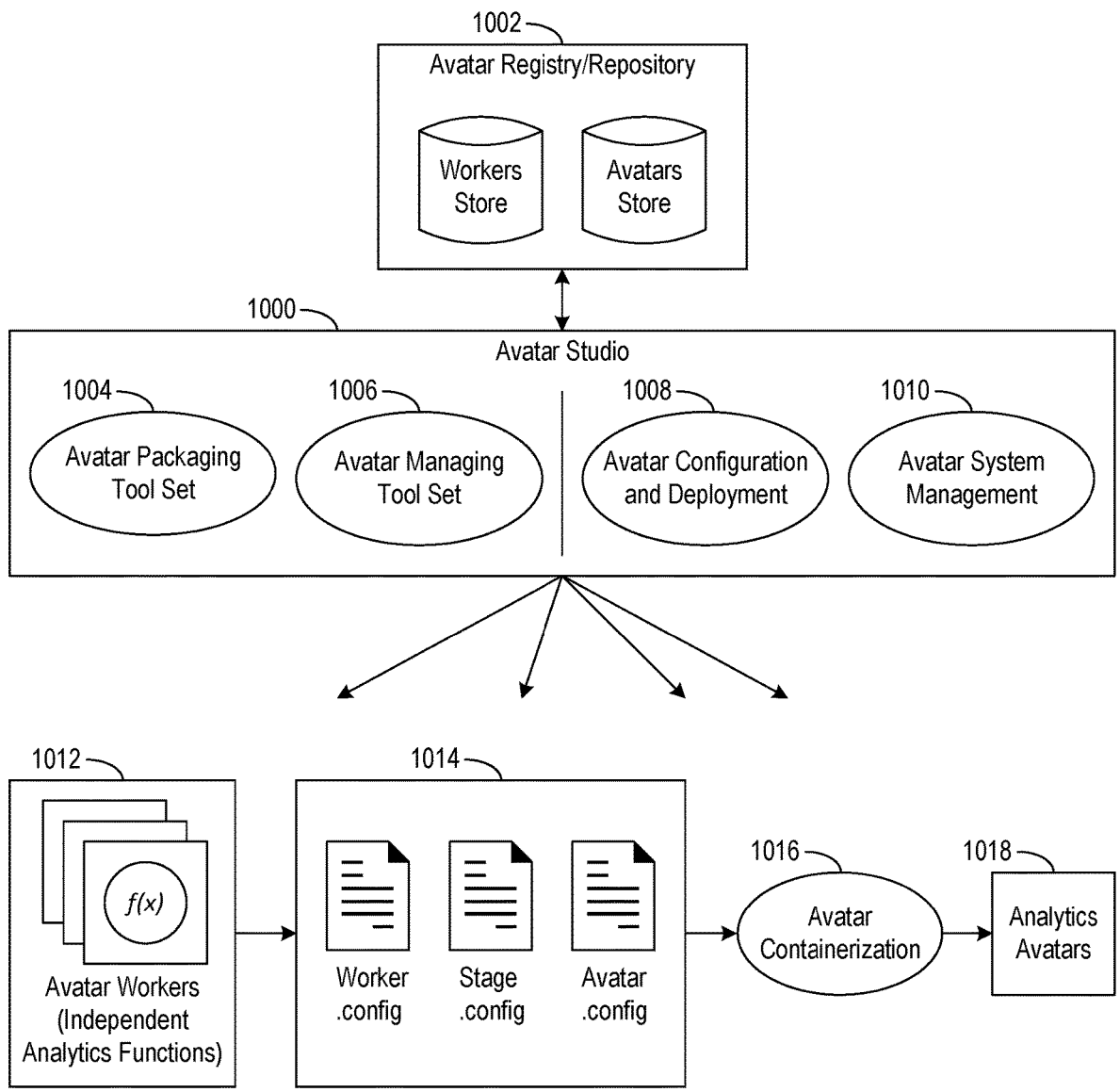
FIG. 10 is a block diagram illustrating an exemplary avatar studio according to embodiments of the present disclosure.

FIG. 10 illustrates an exemplary avatar studio 1000 that users (e.g., data scientists, analytics developers, etc.) may use to assemble workers into one or more data processing pipelines for an analytics avatar. These users may also be (and typically are) the same users who initially developed the workers for the various industrial assets and asset types. In general, the avatar studio 1000 provides a uniform engineering platform for data scientists and analytics developers to collaborate and share work with each other in order to minimize duplicate efforts. Workers 1012 and the resulting avatars 1018 designed and developed by one user may be uploaded and made available on an avatar registry/repository 1002 via the avatar studio 1000. Other users may then retrieve and use (or reuse) the workers and avatars in the registry/repository 1002 to build their own predictive diagnostic functions, for example, by combining the workers 1012 into one or more new avatars 1018, or simply reusing one or more existing avatars.

As can be seen, the exemplary avatar studio 1000 provides users with several tool sets and capabilities for building and managing the avatars, including an avatar packaging tool set 1004, an avatar managing tool set 1006, an avatar configuration and deployment capability 1008, and an avatar system management capability 1010. In general, the avatar packaging tool set 1004 includes tools that users can use to assemble workers 1012 into one or more data processing pipelines, edit the workers and pipelines as needed via their configuration files 1014, then package or containerize (1016) the workers and pipelines into avatars 1018. This is similar to the tool set 500 discussed in FIG. 5. The avatar managing tool set 1006 includes tools that users can use to perform various administrative tasks (e.g., organize, upload, download, etc.) on the workers, pipelines, and avatars. The avatar configuration and deployment capability 1008 of the avatar studio 1000 can be used generally to configure the workers, pipelines, and avatars (e.g., via their configuration files) and deploy the avatars on their intended analytics platform and computing nodes. Similarly, the avatar system management capability 1010 can be used generally to monitor and manage (e.g., start, pause, stop, etc.) already deployed avatars.

The above analytics avatar embodiments of the present disclosure provide a standard and consistent way to develop predictive diagnostic products/solutions for multiple types of industrial assets. Once developed, the analytic avatars can be reused and/or retrained and redeployed, thus significantly reducing the engineering time to package a new predictive analytics model for similar equipment type. The avatars are self-reliant and loosely coupled to their respective data streams, which allows them to be tied to any equipment instances and run with any DCS (distributed control system), SCADA (supervisory control and data acquisition) system, or any other type of monitoring and control system. This avoids the need to provide a separate predictive diagnostic product/solution for each computing platform (e.g., cloud, edge, embedded device, etc.).

Figure 11:
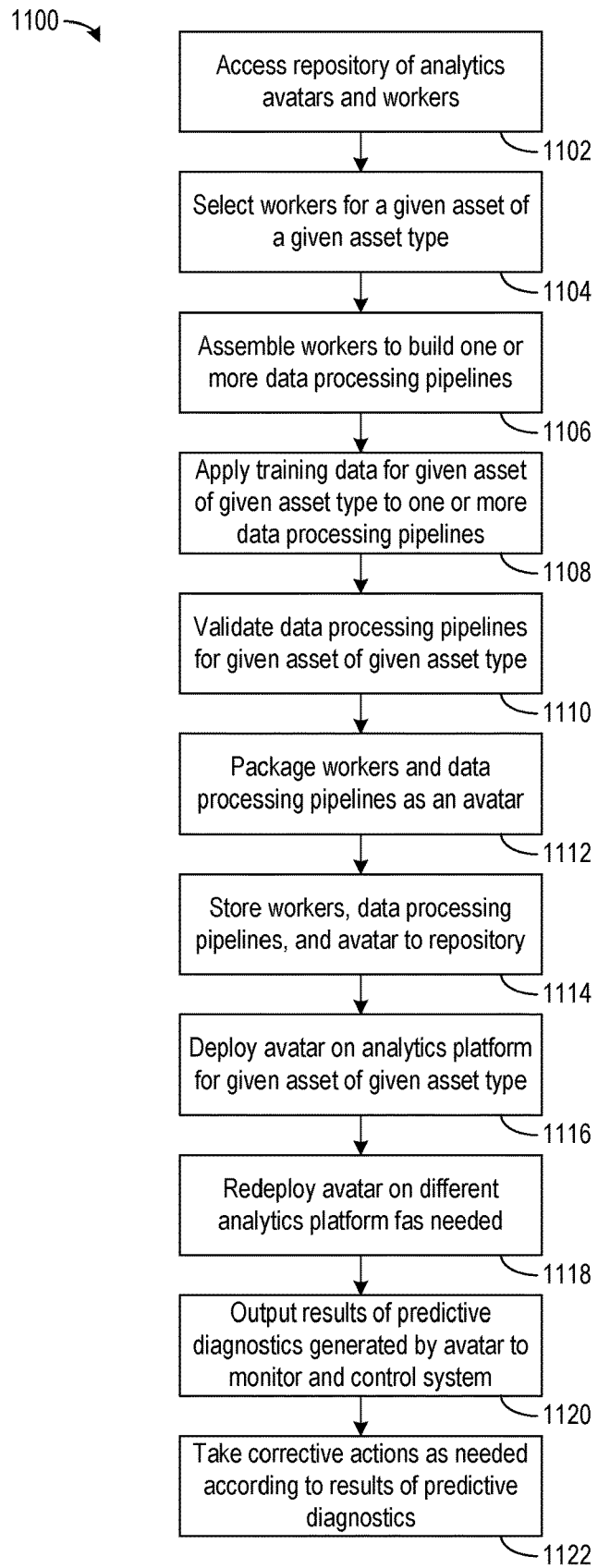
FIG. 11 illustrates an exemplary workflow for constructing an analytics avatar according to embodiments of the present disclosure.

Turning now to FIG. 11, an exemplary flowchart is shown representing a method 1100 that may be used to provide predictive analytics for industrial assets using the analytics avatar embodiments disclosed herein. The method generally begins at 1102 where a user (e.g., data scientist, analytics developer, etc.) accesses a registry or repository of existing analytics avatars and workers, for example, using the avatar packaging tool set discussed herein. As discussed, the avatars and the workers are configured specifically for a particular industrial asset of a particular asset type. For example, some avatars and workers may be configured for compressors of Type X, while other avatars and workers may be configured for pumps of Type Y, and so forth.

At 1104, the user selects specific workers from among the available workers in the avatar repository. The workers that are selected constitute (or contain) the core analytics components needed to provide a given predictive analytics function for a given asset of a given asset type. These workers may include, for example, a data cleansing worker, a data transformation worker, and a data classifier and/or predictor worker. Depending on the requirements of the intended deployment, the selected workers may also include a data injector worker and a data emission worker. At 1106, the user assembles or otherwise combines the selected workers with one another to build one or more data processing pipelines. The user may also modify any worker at this point by editing the configuration files for that worker as needed.

At 1108, a training dataset (e.g., historical data) for the given asset of the given type is applied to the one or more data processing pipelines for training purposes. At 1110, the one or more data processing pipelines are validated for the given asset of the given type, for example, using an additional training dataset or actual (e.g., live streaming) data. At 1112, the workers and the one or more data processing pipelines, as well as the configuration files therefor, are packaged or containerized into an independent, self-reliant predictive diagnostic unit or entity, which forms the avatar. The user may perform the containerization using any of the containerization tools mentioned earlier (e.g., Docker, Nano, etc.). This containerization allows the avatar to be deployed on virtually any computing platform to provide predictive diagnostics for the given asset of the given asset type.

At 1114, the avatar and the workers and data processing pipelines therefor are stored to the avatar repository for subsequent use and reuse by others. At 1116, the user deploys the avatar to a desired computing platform to provide predictive diagnostics for the given asset of the given asset type. Deployment involves loosely coupling the avatar to the data stream for the given asset of the given asset type using an appropriate messaging protocol (e.g., AMQP, MQTT, JMS, XMPP, etc.), which avoids the need to provide a specific messaging protocol in the avatar. At 1118, the same avatar may be redeployed on a different computing platform for the same given asset of the same given asset type (e.g., at a different industrial plant) as needed. Optionally, retraining of the avatar may be performed prior to the subsequent deployment as needed using training data for the subsequent asset.

At 1120, the results of the predictive diagnostics performed by the avatar is provided to an external system, such as a monitor and control system for the industrial asset. These results may include, for example, detection of a fault and time until occurrence of the fault, an anomaly, wear-and-tear, aging, and the like, depending on the type of predictive diagnostics performed by the avatar. At 1122, the monitor and control system takes any corrective actions that may be needed based on the results of the predictive diagnostics. For example, the monitor and control system may cut compressor power, reduce motor speed, sound alarm, and other similar actions.

Figure 12:
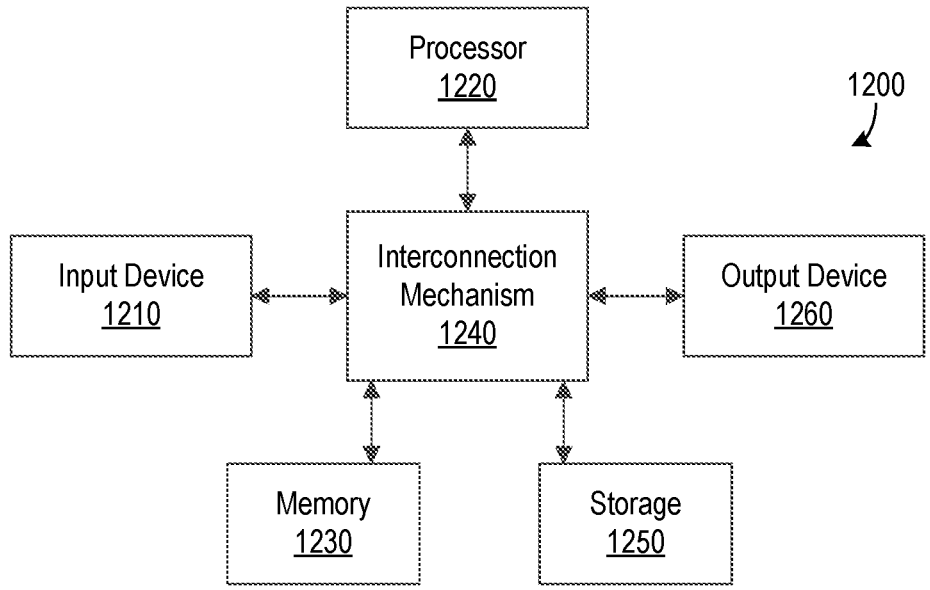
FIG. 12 is a functional block diagram of a general-purpose computer system that may be used to implement various embodiments of this disclosure.

FIG. 12 illustrates an exemplary computing system (or node) that may be used to implement various embodiments of this disclosure. In general, any general-purpose computer systems used in various embodiments of this disclosure may be used, for example, general-purpose computers such as those based on one or multiple processors from Intel®, Motorola®, Advanced Micro Devices, Sun®, Hewlett-Packard®, or any other type of processor. Such computer systems may be either physical or virtual.

For example, various embodiments of the disclosure may be implemented as specialized software executing in a general-purpose computer system 1200 such as that shown in FIG. 12. The computer system 1200 may include at least one processor 1220 connected to one or more memory devices 1230, such as a disk drive, memory, or other device for storing data. Memory 1230 is typically used for storing programs and data during operation of the computer system 1200. The computer system 1200 may also include a storage system 1250 that provides additional storage capacity. Components of computer system 1200 may be coupled by an interconnection mechanism 1240, which may include one or more busses (e.g., between components that are integrated within the same machine) and/or a network (e.g., between components that reside on separate discrete machines). The interconnection mechanism 1240 enables communications (e.g., data, instructions) to be exchanged between system components of system 1200.

Computer system 1200 also includes one or more input devices 1210, for example, a keyboard, mouse, trackball, microphone, touch screen, and one or more output devices 1260, for example, a printing device, display screen, speaker. In addition, computer system 1200 may contain one or more interfaces (not shown) that connect computer system 1200 to a communication network (in addition or as an alternative to the interconnection mechanism 1240).

Figure 13:
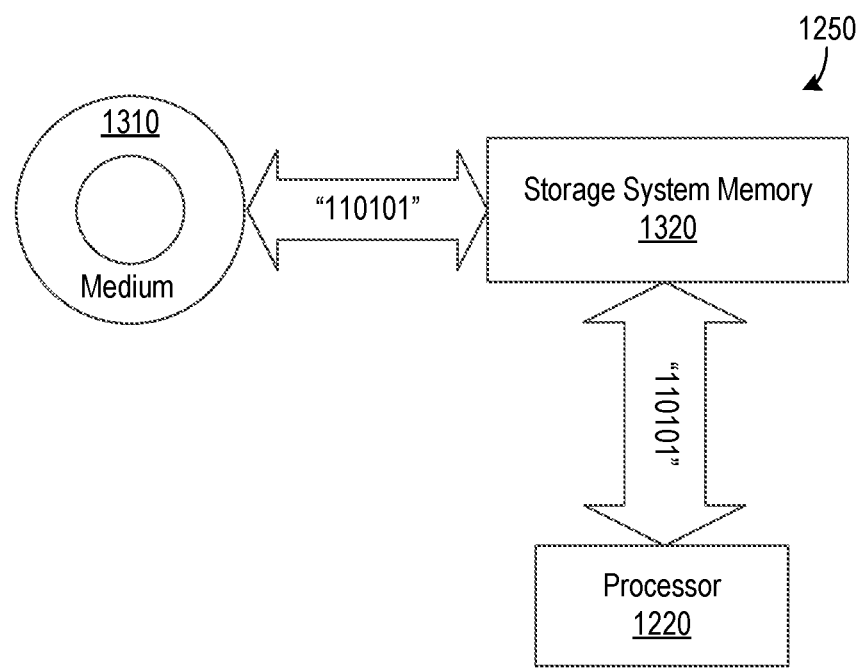
FIG. 13 is a functional block diagram of a general-purpose storage system that may be used to implement various embodiments of this disclosure.

The storage system 1250, shown in greater detail in FIG. 13, typically includes a computer readable and writeable nonvolatile recording medium 1310 in which signals are stored that define a program to be executed by the at least one processor 1220 or information stored on or in the medium 1310 to be processed by the program to perform one or more functions associated with embodiments described herein. The medium may, for example, be a disk or flash memory. Typically, in operation, the at least one processor 1220 causes data to be read from the nonvolatile recording medium 1310 into storage system memory 1320 that allows for faster access to the information by the at least one processor than does the medium 1310. This storage system memory 1320 is typically a volatile, random access memory such as a dynamic random-access memory (DRAM) or static memory (SRAM). This storage system memory 1320 may be located in storage system 1250, as shown, or in the system memory 1230. The at least one processor 1220 generally manipulates the data within the memory system 1230 1320 and then copies the data to the medium 1310 after processing is completed. A variety of mechanisms are known for managing data movement between the medium 1310 and the integrated circuit memory element 1230, 1320, and the disclosure is not limited thereto. The disclosure is not limited to a particular memory system 1230 or storage system 1250.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 1200 is shown by way of example as one type of computer system upon which various aspects of the disclosure may be practiced, it should be appreciated that aspects of the disclosure are not limited to being implemented on the computer system as shown in FIG. 13. Various aspects of the disclosure may be practiced on one or more computers having a different architecture or components shown in FIG. 13. Further, where functions or processes of embodiments of the disclosure are described herein (or in the claims) as being performed on a processor or controller, such description is intended to include systems that use more than one processor or controller to perform the functions.

Computer system 1200 may be a general-purpose computer system that is programmable using a high-level computer programming language. Computer system 1200 may be also implemented using specially programmed, special purpose hardware. In computer system 1200, at least one processor 1220 is typically a commercially available processor such as the well-known Pentium class processor available from the Intel Corporation. Many other processors are available. Such a processor usually executes an operating system which may be, for example, the Windows 125, Windows 128, Windows NT, Windows 2000, Windows ME, Windows XP, Vista, Windows 7, Windows 13, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other operating systems may be used.

The at least one processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the disclosure may be distributed among one or more computer systems configured to provide a service (e.g., servers) to one or more client computers, or to perform an overall task as part of a distributed system. For another example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

Various embodiments of the present disclosure may be programmed using programming languages such as Python, R, MATLAB, SmallTalk, Java, C++, Ada, or C# (C-Sharp). Other programming languages may also be used, such as BASIC, Fortran, Cobol, TCL, or Lua. Various aspects of the disclosure may be implemented in a non-programmed environment (e.g., analytics platforms, or documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A system for providing predictive diagnostics on an industrial asset, comprising:
    at least one processor;
    a storage system communicatively coupled to the at least one processor and storing instructions thereon that, when executed by the at least one processor, cause the system to:
    perform a process that selects a plurality of workers from a repository and connects the workers to one another to build a data processing pipeline, each worker performing a different task in the data processing pipeline;
    perform a process that containerizes the plurality of workers and the data processing pipeline to form an analytics avatar and stores the analytics avatar, as containerized, in the repository, the repository storing a plurality of analytics avatars for subsequent use and reuse;
    perform a process that selects a first analytics avatar from the plurality of analytics avatars in the repository, each analytics avatar configured to provide a respective predictive diagnostic function for a respective asset of a respective type, independent of computing systems;
    perform a process that deploys the first analytics avatar to a first computing system, the first analytics avatar operating on the first computing system to provide a given predictive diagnostic function for a first asset of a given type; and
    perform a process that deploys the first analytics avatar to a second computing system different from the first computing system for reuse, the first analytics avatar operating on the second computing system to provide the given predictive diagnostic function for a second asset of said given type.

2. The system of claim 1, wherein the instructions cause the system to perform a process that selects a plurality of workers from the repository and connects the workers by dragging and dropping the workers to one another to build a data processing pipeline for a second analytics avatar, each worker performing a different task in the data processing pipeline for the second analytics avatar.

3. The system of claim 2, wherein the instructions cause the system to perform a process that containerizes the plurality of workers and the data processing pipeline to form the second analytics avatar, the second analytics avatar configured to provide a different diagnostic function from the first analytics avatar.

4. The system of claim 3, wherein the instructions cause the system to perform a process that stores the second analytics avatar to the repository for subsequent use and reuse.

5. The system of claim 1, wherein the instructions cause the system to perform a process that loosely couples the first analytics avatar to a data stream from the first asset of the given type.

6. The system of claim 1, wherein the instructions cause the system to perform a process that couples the first analytics avatar to a digital twin of the first asset of the given type.

7. The system of claim 1, wherein the instructions cause the system to perform a process that outputs a results of the given predictive diagnostic function of the first analytics avatar to a monitor and control system, and wherein the monitor and control system takes a specified corrective action based on the results of the given predictive diagnostic function.

8. A method of providing predictive diagnostics on an industrial asset, comprising:
    selecting a plurality of workers from a repository and connecting the workers to one another to build a data processing pipeline, each worker performing a different task in the data processing pipeline;
    containerizing the plurality of workers and the data processing pipeline to form an analytics avatar and storing the analytics avatar, as containerized, in the repository, the repository storing a plurality of analytics avatars for subsequent use and reuse;
    selecting a first analytics avatar from a plurality of analytics avatars in a repository, each analytics avatar configured to provide a respective predictive diagnostic function for a respective asset of a respective type, independent of computing systems;
    deploying the first analytics avatar to a first computing system, the first analytics avatar operating on the first computing system to provide a given predictive diagnostic function for a first asset of a given type; and
    deploying the first analytics avatar to a second computing system different from the first computing system for reuse, the first analytics avatar operating on the second computing system to provide the given predictive diagnostic function for a second asset of said given type.

9. The method of claim 8, further comprising selecting a plurality of workers from the repository and connecting the workers by dragging and dropping the workers to one another to build a data processing pipeline for a second analytics avatar, each worker performing a different task in the data processing pipeline for the second analytics avatar.

10. The method of claim 9, further comprising containerizing the plurality of workers and the data processing pipeline to form the second analytics avatar, the second analytics avatar configured to provide a different diagnostic function from the first analytics avatar.

11. The method of claim 10, further comprising storing the second analytics avatar to the repository for subsequent use and reuse.

12. The method of claim 8, further comprising loosely coupling the first analytics avatar to a data stream from the first asset of the given type.

13. The method of claim 8, further comprising coupling the first analytics avatar to a digital twin of the first asset of the given type.

14. The method of claim 8, further comprising outputting a results of the given predictive diagnostic function of the first analytics avatar to a monitor and control system, wherein the monitor and control system takes a specified corrective action based on the results of the given predictive diagnostic function.

15. A system for providing predictive diagnostics on an industrial asset, comprising:
    a repository storing a plurality of analytics avatars thereon, each analytics avatar configured to provide a respective predictive diagnostic function for a respective asset of a respective type, independent of computing systems;
    a studio platform connected to the repository, the studio platform having a plurality of avatar tools thereon, the plurality of avatar tools are configured to:
    select a plurality of workers from a repository and connect the workers to one another to build a data processing pipeline, each worker performing a different task in the data processing pipeline;
    containerize the plurality of workers and the data processing pipeline to form an analytics avatar and storing the analytics avatar, as containerized, in the repository for subsequent use and reuse;
    select a first analytics avatar from the plurality of analytics avatars in the repository;
    deploy the first analytics avatar to a first computing system, the first analytics avatar operating on the first computing system to provide a given predictive diagnostic function for a first asset of a given type; and
    deploy the first analytics avatar to a second computing system different from the first computing system for reuse, the first analytics avatar operating on the second computing system to provide the given predictive diagnostic function for a second asset of said given type.

16. The system of claim 15, wherein the avatar tools are further configured to select a plurality of workers from the repository and connect the workers by dragging and dropping the workers to one another to build a data processing pipeline for a second analytics avatar, each worker performing a different task in the data processing pipeline for the second analytics avatar.

17. The system of claim 16, wherein the avatar tools are further configured to containerize the plurality of workers and the data processing pipeline to form the second analytics avatar, the second analytics avatar configured to provide a different diagnostic function from the first analytics avatar.

18. The system of claim 17, wherein the avatar tools are further configured to store the second analytics avatar to the repository for subsequent use and reuse.

19. The system of claim 15, wherein the avatar tools are further configured to loosely couple the first analytics avatar to a data stream from the first asset of the given type.

20. The system of claim 15, wherein the avatar tools are further configured to couple the first analytics avatar to a digital twin of the first asset of the given type.

* * * * *